(12) United States Patent
Yamamoto

(10) Patent No.: US 6,201,618 B1
(45) Date of Patent: Mar. 13, 2001

(54) IMAGE READING DEVICE

(75) Inventor: Yasuhiro Yamamoto, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/086,556

(22) Filed: May 29, 1998

(30) Foreign Application Priority Data

Jun. 3, 1997 (JP) .................................................. 9-160413

(51) Int. Cl.$^7$ ...................................................... H04N 1/04
(52) U.S. Cl. ............................................................ 358/487
(58) Field of Search .................................... 358/487, 506, 358/522, 474, 453; 382/318, 319, 176, 169

(56) References Cited

U.S. PATENT DOCUMENTS

| | | | | |
|---|---|---|---|---|
| 4,847,689 | * | 7/1989 | Yamamoto | 358/80 |
| 5,182,576 | * | 1/1993 | Miwa | 346/108 |
| 5,544,258 | * | 8/1996 | Levien | 382/169 |
| 5,684,601 | * | 11/1997 | Endo | 358/486 |
| 5,742,704 | * | 4/1998 | Suzuki et al. | 382/176 |
| 5,768,444 | * | 6/1998 | Nishimura | 358/506 |
| 5,781,314 | * | 7/1998 | Mochizuki | 358/509 |
| 5,812,695 | * | 9/1998 | Dawe | 382/176 |
| 5,936,748 | * | 8/1999 | Yamamoto | 358/504 |
| 5,946,109 | * | 8/1999 | Abe | 358/453 |
| 6,057,937 | * | 5/2000 | Shimizu | 358/302 |

\* cited by examiner

*Primary Examiner*—Jerome Grant, II
(74) *Attorney, Agent, or Firm*—Greenblum & Bernstein, P.L.C.

(57) ABSTRACT

The image reading device has a scan control processor that performs a coarse scanning operation, in which a film is intermittently moved so that a line sensor scans the image, in order to obtain an optimum exposure time and a color correction coefficient. The coarse scanning operation includes a first reading mode and a second reading mode. In the first reading mode, a reading pitch for a center portion of the image is finer than that for peripheral portions of the image. In the second reading mode, the whole of the image is coarse-scanned with a uniform pitch. Due to the coarse scanning operation according to the first reading mode, an exposure measurement is performed with the center portion of the image being weighted.

19 Claims, 8 Drawing Sheets

IMAGE READING DEVICE

BACKGROUND OF THE INVENTION

1. Field of the Invention

The present invention relates to an image reading device in which an image, recorded in a film, for example, is irradiated with a light beam and the image is read using a line sensor.

2. Description of the Related Art

Conventionally, there is known an image reading device in which a film is intermittently moved along a direction perpendicular to a longitudinal direction of a line sensor, so that an image is read line by line. Namely, while the film is stopped, a light beam outputted from a light source illuminates the film, so that one line image is sensed by the line sensor. After this sensing operation, the film is moved by a predetermined amount by a moving mechanism. The sensing operation and the movement are repeatedly carried out, so that one frame image is read.

In such a reading operation, i.e. a scanning operation, first, the image is scanned with a coarse pitch, so that an exposure measurement is carried out based on image data obtained by this coarse pitch scanning operation, to obtain an optimum exposure time and a color correction coefficient. The optimum exposure time is the ideal period for which electric charges should be accumulated in the line sensor, and the color correction coefficient is used for obtaining a color image having an optimum color balance when the image is reproduced.

In the exposure measurement, the image is coarsely scanned with a uniform pitch over the whole image. Namely, the whole of the image is treated uniformly in order to calculate the optimum exposure time and the color correction coefficient. However, in an image in which a high luminance object is recorded at the center portion thereof, for example, since the optimum exposure time and the color correction coefficient are not calculated with emphases on the object, the object image may not be reproduced with a luminance and color which are desired by the user.

SUMMARY OF THE INVENTION

Therefore, an object of the present invention is to provide an image reading device by which an exposure measurement can be performed with putting emphases on a part of an image recorded in a film.

According to the present invention, there is provided an image reading device comprising an optical sensor and a scan control processor. The optical sensor reads an image recorded in a film, which has a first part and a second part. The scan control processor intermittently moves at least one of the optical sensor and the film with a predetermined reading pitch, so that the optical sensor scans the image. The scan control processor is operable in a first reading mode in which the image recorded in the first part is read with a first reading pitch, which is finer than a second reading pitch with which the image recorded in the second part is read.

Further, according to the present invention, there is provided an image reading device comprising an optical sensor, a scan control processor and a pixel control processor. The optical sensor reads an image recorded in a film and outputs image data including pixel signals. The film has a first part and a second part. The scan control processor moves at least one of the optical sensor and the film, so that the optical sensor scans the image. The pixel control processor controls a number of the pixel signals outputted from the optical sensor, when the optical sensor scans the image, and is operable in a first reading mode in which the pixel signals of the first part are outputted with a first pixel pitch, which is finer than a second pixel pitch with which the pixel signals of the second part are outputted.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
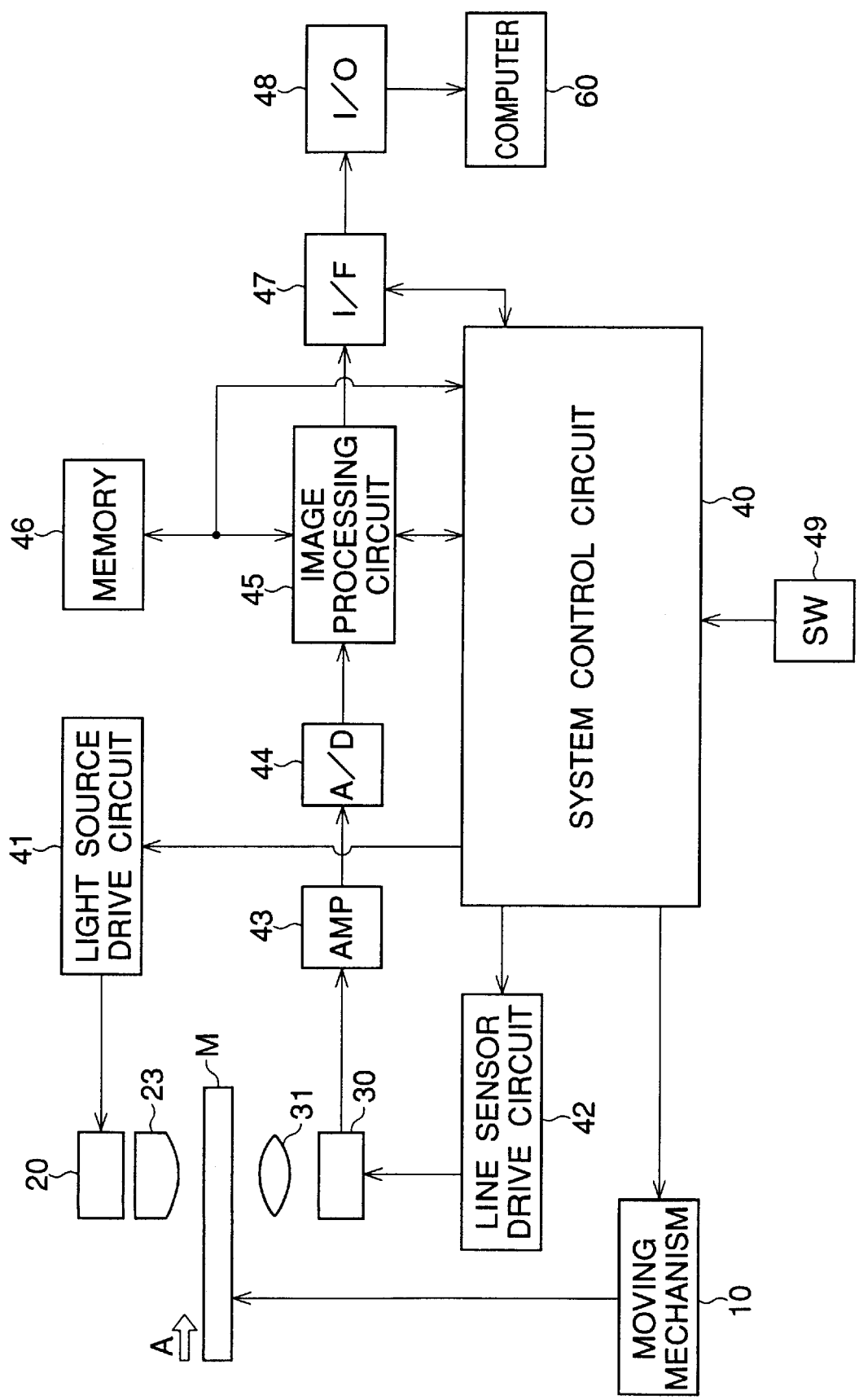
FIG. 1 is a block diagram showing an image reading device of a first embodiment of the present invention.

The present invention will be described below with reference to embodiments shown in the drawings.

FIG. 1 shows an electrical structure of an image reading device of a first embodiment of the present invention.

A read object M, handled by this image reading device, is a transparent negative or positive film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital image data is subjected to an image process, such as a shading correction, in an image processing circuit 45, and is then stored in a memory 46.

The image data, subsequent to being read from the memory 46, is subjected to various correction processes, such as a color correction and a gamma correction. Then, the image data is converted to a signal, which conforms to a predetermined format, by an interface circuit 47, and is outputted to an external computer (i.e. an image processing device) 60 through an input/output terminal 48. Thus, the image reading device and the external computer 60 can communicate with each other through the interface circuit 47 and the input/output terminal 48, so that various control operations can be performed in the image reading device and the external computer 60. The image processing circuit 45 and the interface circuit 47 are controlled by the system control circuit 40.

In this embodiment, although all of the operations can be controlled by the external computer 60, a switch 49 may be connected to the system control circuit 40, so that various operations can be performed, such as reading the image recorded on the film M, for example.

Figure 2:
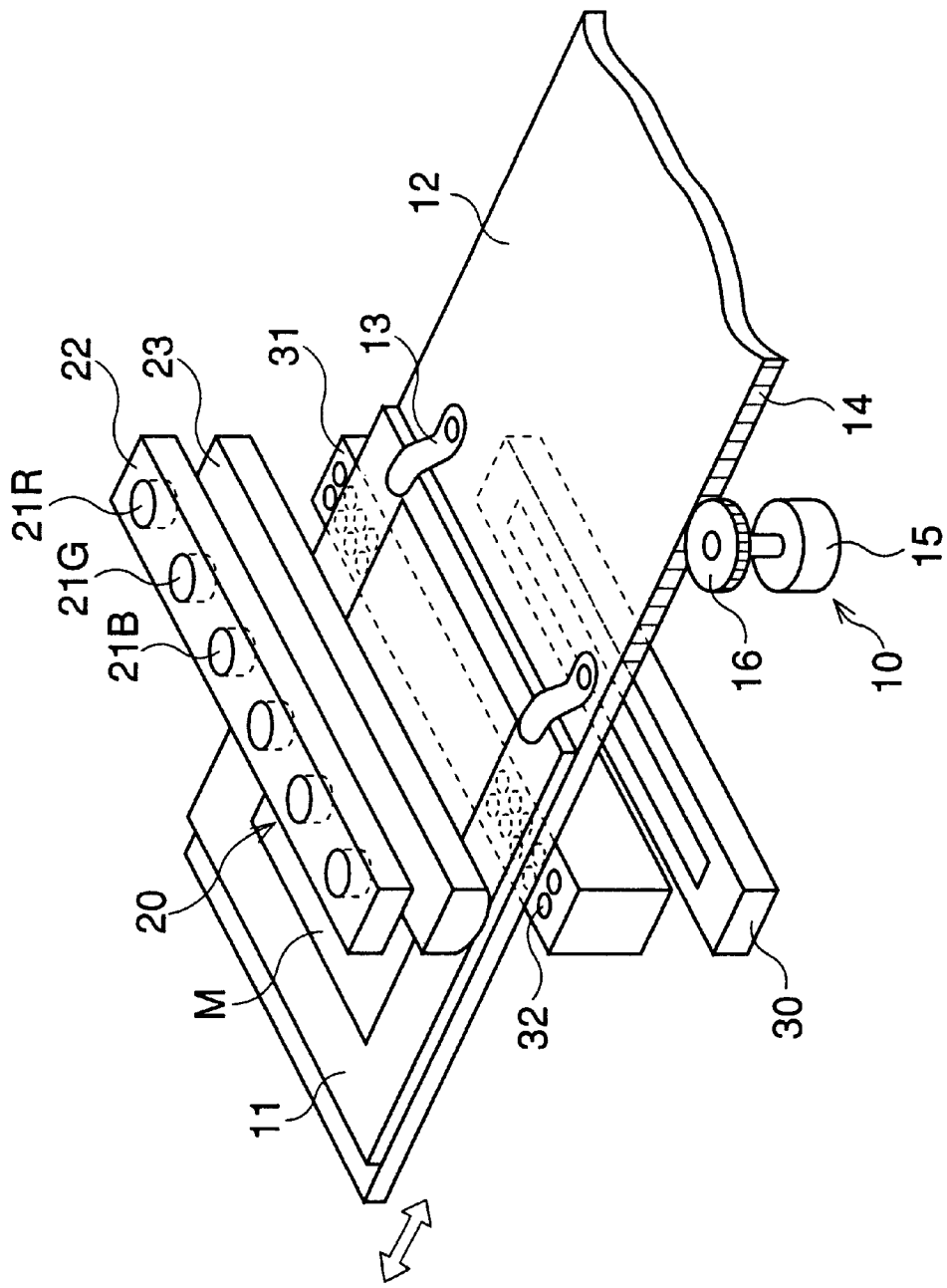
FIG. 2 is a perspective view showing a moving mechanism, a light source and a line sensor, when a transparent film is used.

FIG. 2 shows the moving mechanism 10, the light source 20 and the line sensor 30. The film M is supported by a frame 11, which is fixed on a plate stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the film M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. This order can be changed in accordance with an object.

The cylindrical lens 23, positioned between the support member 22 and the stage 12, is extended in parallel with the support member 22. Namely, light emitted by the light-emitting diodes 21R, 21G and 21B is fcondensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
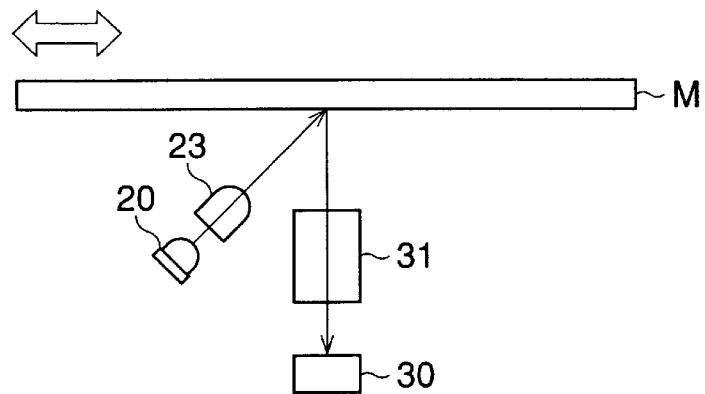
FIG. 3 is a view showing a structure, including a light source and a line sensor, used for reading an image recorded on a read object from which a light beam is reflected.

FIG. 3 shows an alternative structure, that includes the light source 20 and the line sensor 30, used for reading an image recorded on a read object M from which a light beam is reflected. In this structure, the light source 20, the cylindrical lens 23, the line sensor 30 and the forming lens 31 are disposed under the read object M. Namely, a light beam outputted from the light source 20 is irradiated on the lower surface of the read object M, so that the light beam reflected by the read object M enters the line sensor 30 through the forming lens 31.

Figure 5:
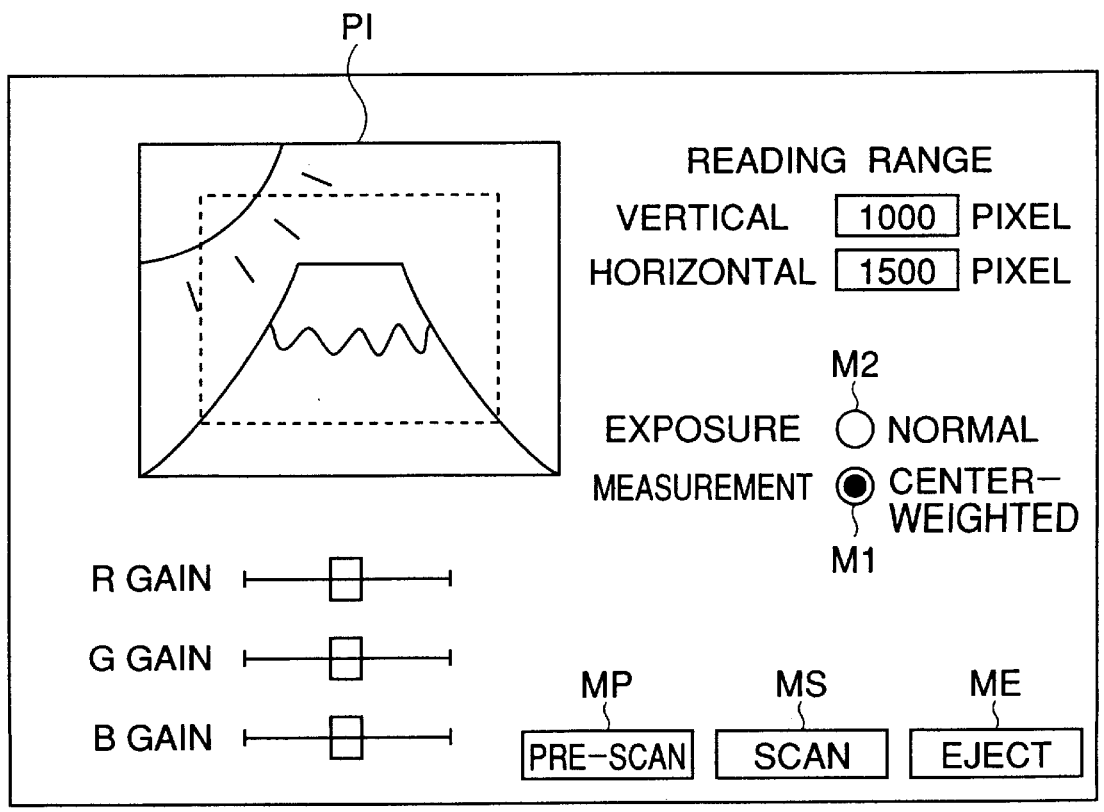
FIG. 5 is a view showing an example of a surface of the display device of the computer.
Figure 4:
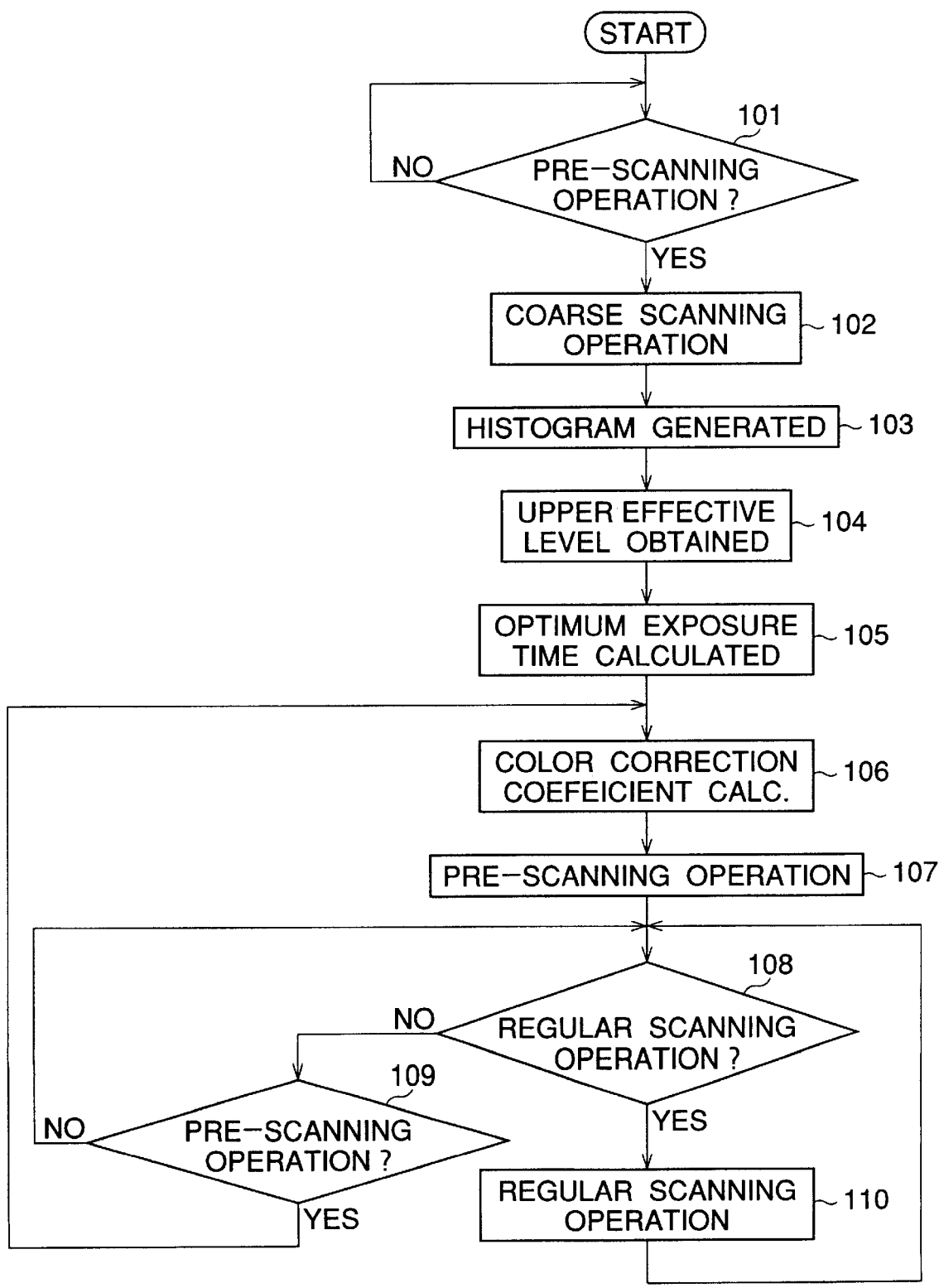
FIG. 4 is a flowchart of an image reading routine executed in the image reading device.
Figure 6:
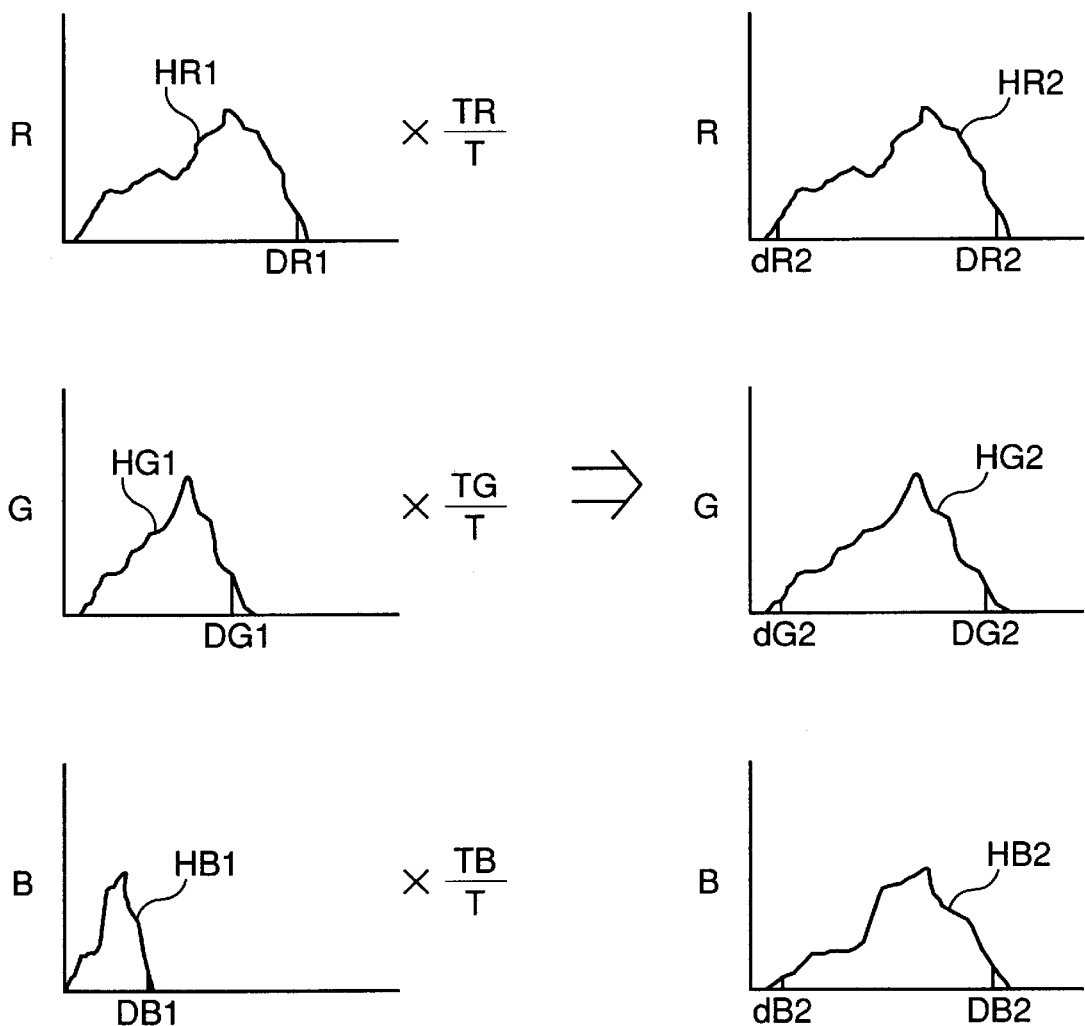
FIG. 6 shows histograms generated in Steps 103 and 106 of the program shown in FIG. 4.

FIG. 4 is a flowchart of an image reading routine executed in the image reading device. FIG. 5 shows an example of a surface of the display device of the computer 60. FIG. 6 shows histograms generated in Steps 103 and 106. With reference to FIGS. 1, 2, 4, 5 and 6, an operation of the image reading device is described below. Note that the operation of the image reading device is controlled by clicking on a predetermined label indicated on the surface of the display device, using a mouse, for example.

In step 101, it is determined whether or not a pre-scanning operation is to be performed. A label "MP", denoting the pre-scanning operation and indicated on the surface of the display device, is clicked and the process goes from Step 101 to Step 102, so that a coarse scanning operation, i.e. an exposure measurement, is carried out. Namely, while the light source 20 is turned ON, the film M is intermittently moved, via the moving mechanism 10, with a relatively coarse pitch. During the intermittent movement, the line sensor 30 is exposed for a predetermined exposure time, so that image data of one frame image is detected. Note that, in the coarse scanning operation, the light source 20 is controlled in such a manner that the light-emitting diodes 21R, 21G and 21B are illuminated in a predetermined order every time the stage 12 is stopped, so that R, G and B image data are obtained.

In Step 103, a histogram representing a distribution of signal levels is generated for each of the R, G and B image data obtained in Step 102. Namely, as shown in FIG. 6, an R-histogram HR1, a G-histogram HG1 and a B-histogram HB1 are obtained. In Step 104, regarding each of the color components R, G and B, upper effective levels DR1, DG1, DB1 are obtained, each of which is a value that is less than the maximum value of the histogram by a predetermined amount. The upper effective level corresponds to a signal level which is obtained as follows: the highest frequency signal levels included in the histogram are summed, and when the sum reaches 0.5%, for example, of the total sum of all of the frequencies included in the histogram, the boundary signal level is the upper effective level.

In Step 105, based on the exposure time "T" from the execution of Step 102, the upper effective levels DR1, DG1 and DB1 obtained in Step 104, and a predetermined value PRD ("1023", for example, representing 10-bit data), an optimum exposure time is calculated for each of the color components. The optimum exposure time TR regarding the red component is:

TR=(PRD/DR1)×T

The optimum exposure time TG regarding the green component is:

TG=(PRD/DG1)×T

The optimum exposure time TB regarding the blue component is:

$$TB=(PRD/DB1) \times T$$

In Step 106, a color correction coefficient is calculated for each of the color components as follows. First, in the histograms HR1, HG1 and HB1, shown on the left side of FIG. 6, by multiplying each of the signal levels (abscissa of the histogram) by a coefficient (TR/T), (TG/T) and (TB/T), respectively, second histograms HR2, HG2 and HB2 are obtained. The second histograms HR2, HG2 and HB2 are estimation of histograms that would be obtained if an image were to be read using the optimum exposure time. Then, regarding the second histogram HR2, an upper effective level DR2 and a lower effective level dR2 are obtained. The same procedure as that executed in Step 104 is utilized to obtain the upper effective level DR2. The lower effective level dR2 is a value which is greater than the minimum value of the histogram by a predetermined amount. In a similar way, regarding the histograms HG2 and HB2, the upper effective levels DG2 and DB2 and the lower effective levels dG2 and dB2 are obtained.

A color correction coefficient CR regarding the red component is obtained as follows:

$$CR=(LR2-LR1)/(DR2-dR2)$$

wherein "LR2" and "LR1" are an upper reference value and a lower reference value in a look-up-table, referred to when performing a gamma correction for the red component, for example.

Similarly, a color correction coefficient CG regarding the green component is obtained as follows:

$$CG=(LG2-LG1)/(DG2-dG2)$$

wherein "LG2" and "LG1" are an upper reference value and a lower reference value in a look-up-table, referred to when performing a gamma correction for the green component, for example.

A color correction coefficient CB regarding the blue component is obtained as follows:

$$CB=(LB2-LB1)/(DB2-dB2)$$

wherein "LB2" and "LB1" are an upper reference value and a lower reference value in a look-up-table, referred to when performing a gamma correction for the blue component, for example.

In Step 107, a pre-scanning operation is performed in accordance with the optimum exposure time obtained in Step 105. In the pre-scanning operation, the film M is set at an initial position in which an end portion of the film M faces the light source 20, and then the image recorded in the film M is read with a pitch, which is coarser than that of a regular scanning operation which is performed in Step 110. In this reading operation, the light-emitting diodes 21R, 21G and 21B are illuminated in a predetermined order every time the stage 12 is stopped, so that R, G and B image data are detected line by line and transmitted to the computer 60. In the computer 60, the image data are subjected to a predetermined process, so that an image PI (FIG. 5) is indicated on a part of the surface of the display device, together with various labels and information.

In Step 108, it is determined whether the regular scanning operation is to be started. The user of the image reading device can determine whether the regular scanning operation is to be started, by observing the pre-scanned image PI indicated on the surface of the display device. When a label "MS" of the regular scanning operation, indicated on the surface of the display device of the computer 60, is clicked, the process goes from Step 108 to Step 110, and when the regular scanning operation is not to be started, Step 109 is executed in which it is determined whether the pre-scanning operation is again to be performed. When the label "MP" of the pre-scanning operation is clicked, the process goes back to Step 106, and when the label "MP" is not clicked, the process goes back to Step 108. Namely, while neither of the labels "MS" nor "MP" is clicked, Steps 108 and 109 are repeatedly executed.

In Step 110, the regular scanning operation is performed. The regular scanning operation is basically the same operation as that of the pre-scanning operation, except that the reading pitch of the line sensor 30 is relatively fine in comparison with the pre-scanning operation. The unprocessed data of the image read by the regular scanning operation are subjected to a shading correction, a color correction, a gamma correction and so on, so that the image is indicated on the surface of the display device of the computer 60. The image reading routine then returns to cycling between Steps 108 and 109.

Note that, if a label "ME", which is indicated on the surface of the display device to imply an ejecting operation, is clicked, the image reading routine ends due to an interruption operation, and the film M is ejected from the image reading device.

Figure 7:
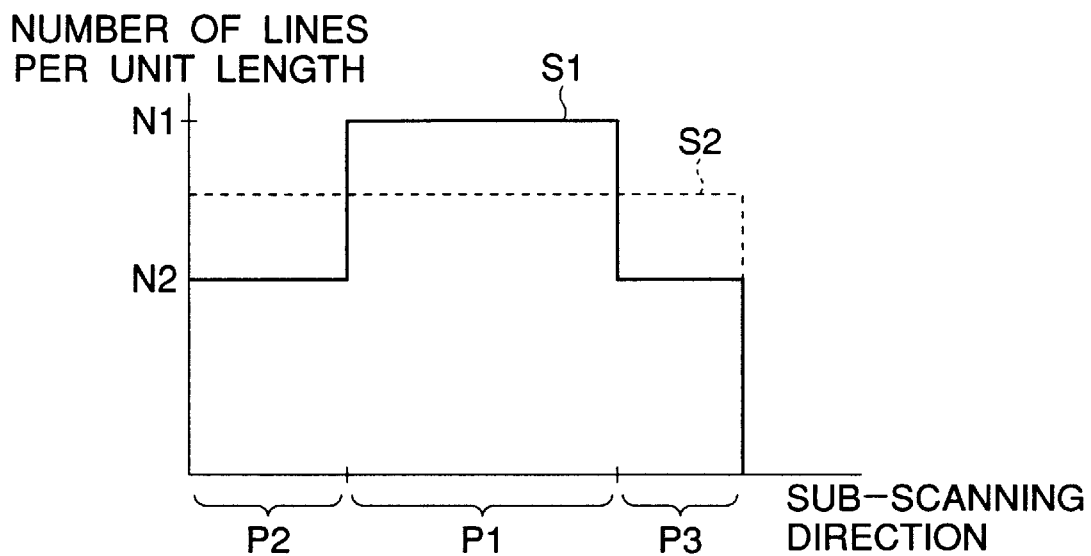
FIG. 7 is a graph showing a distribution of a number of lines per unit length, which are read by the line sensor in a course scanning operation of the first embodiment.

FIG. 7 shows a distribution of a number of read lines per unit length, which are read by the line sensor 30 in the coarse scanning operation (Step 102 of FIG. 4) of the first embodiment of the present invention. In this drawing, the abscissa indicates a sub-scanning direction, i.e. a direction in which the film M is moved, and the ordinate denotes the number of lines. Solid lines S1 and S2 indicate distributions of the number of lines in first and second reading modes, respectively, which are interchangeable. The changing operation is carried out by clicking on one of the circular labels M1 or M2, corresponding to "CENTER-WEIGHTED" or "NORMAL", displayed adjacent to the indication of "EXPOSURE MEASUREMENT" on the surface of the display device, as shown in FIG. 5. Note that "CENTER-WEIGHTED" refers to the first reading mode S1, and "NORMAL" refers to the second reading mode S2.

In FIG. 7, the reading operation of an image by the line sensor 30 is carried out from the left to the right. Namely, the image is read in order of a left peripheral portion P2, a center portion P1 and a right peripheral portion P3. In this reading operation of the first reading mode S1, a feeding pitch (i.e. a reading pitch) of the feeding motor 15 can be set to a first pitch, which is relatively fine, and a second pitch, which is relatively coarse.

When a reading operation is started in the first reading mode S1, first, the feeding motor 15 is driven with the second pitch, so that the coarse scanning operation is performed. In the system control circuit 40, the positional relationship between the film M and the line sensor 30 is recognized based on the total amount of movement of the feeding motor 15. When the first peripheral portion P2 of the image has been read, the feeding pitch of the feeding motor 15 is changed to the first pitch, and thus the coarse scanning operation of the center portion P1 is carried out. When the reading of the center portion P1 is completed, the feeding pitch of the feeding motor 15 is again changed to the second pitch, and thus the coarse scanning operation of the second peripheral portion P3 is carried out.

Thus, in the first reading mode S1, the number of lines N1 per unit length in the center portion P1 of the image is greater than the number of lines N2 per unit length in each of the periperal portions P2 and P3, i.e. N1 may be double N2. Namely, in the first reading operation, the reading pitch in the center portion P1 of the image is finer than the reading pitch in each of the peripheral portions P2 and P3. In the example shown in FIG. 7, the length of the center portion P1 in the sub-scanning direction is approximately 50% of the whole length.

Conversely, in the second reading mode S2, the whole image is read with a uniform reading pitch having an intermediate value taken from between the first and second pitches.

When the coarse scanning operation is performed in the first reading mode, the amount of the image data per unit length in the center portion P1, in comparison with an average amount of image data per unit length over the whole of the image, becomes large. In the determination process (i.e. Step 105 of FIG. 4) of the optimum exposure time, the exposure times of the pre-scanning operation and the regular scanning operation are determined based on the histograms ((HR2, HG2, HB2) of all of the image data being read using a hypothetical first reading mode corresponding to the first reading mode S1. Namely, since the estimated histograms of all of the image data, having been read in a hypothetical first reading mode, indicate distributions in which the image data of the center portion P1 is weighted, the optimum exposure time, which is finally obtained, corresponds to a result of a calculation performed with the center portion P1 being weighted. In other words, according to the coarse scanning operation in the first reading mode S1, in comparison with a conventional device in which the image data of all of the image is treated uniformly, a desired image can be reproduced on a surface of the display device, with an important part of the object image, placed at a center portion of the frame, possessing an increased definition.

In FIG. 7, the abscissa indicates the sub-scanning direction (i.e. a direction in which the film M is fed). Namely, in the first embodiment, the reading pitch of the sub-scanning direction is changed in accordance with a portion of the image. Conversely, in a second embodiment, the reading pitch in the longitudinal direction (i.e. the main scanning direction) may be changed. Namely, for example, it is possible that a pixel pitch in the main scanning direction is set to be relatively fine in the center portion P1 of the image, and the pixel pitch in the main scanning direction is set to be relatively coarse in the peripheral portions P2 and P3.

Figure 8:
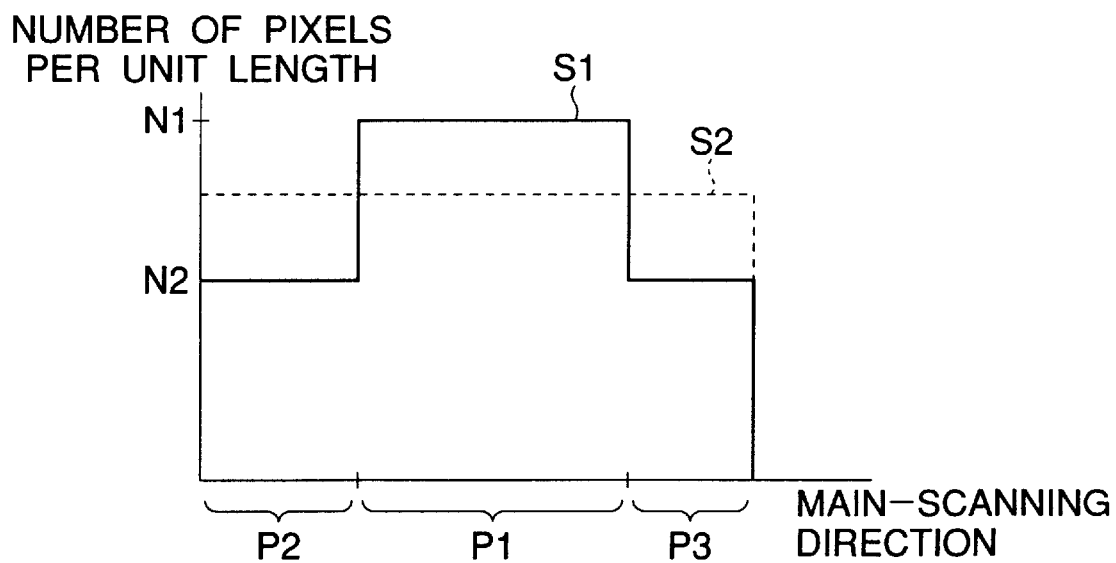
FIG. 8 is a graph showing a distribution of a number of pixels in each part of the image, which are read by the line sensor in a course scanning operation of the second embodiment.

This is achieved utilizing the following construction. As shown in FIG. 8, when the pixel data read from the photodiodes, which are aligned in the longitudinal direction of the line sensor 30, are stored in the memory 46, the pixel data are thinned for every predetermined number of pixels. Namely, when the pixel data of the center portion P1 are stored in the memory 46, the number of thinned pixels is set to be less than that of the peripheral portions P2 and P3, so that the pixel data of the center portion P1 is increased relative to the peripheral portions P2 and P3.

Note that the electrical and mechanical structures of the second embodiment are identical to those of the first embodiment.

Figure 9:
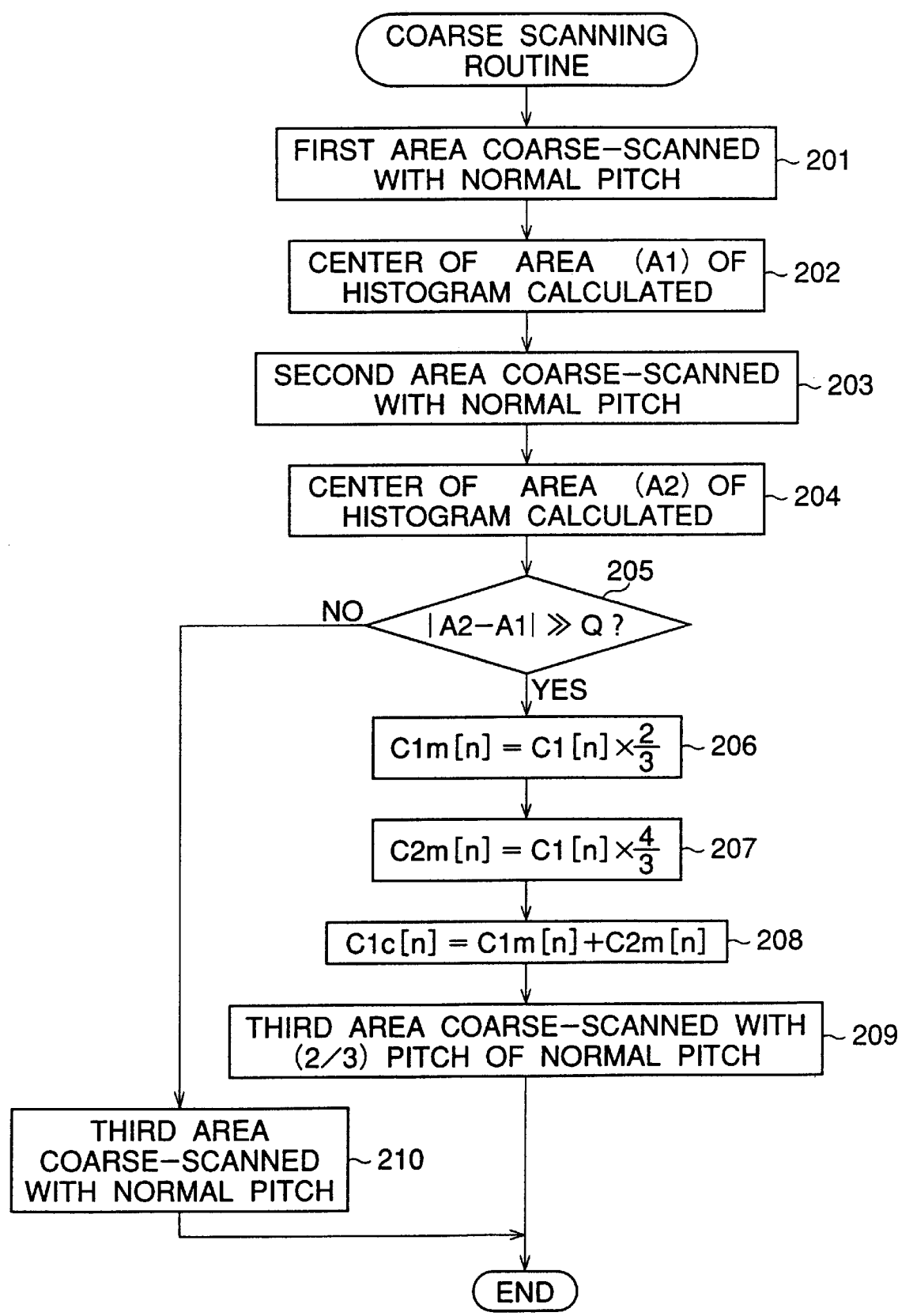
FIG. 9 is a flowchart of a program for performing the coarse scanning operation in a third embodiment.
Figure 10:
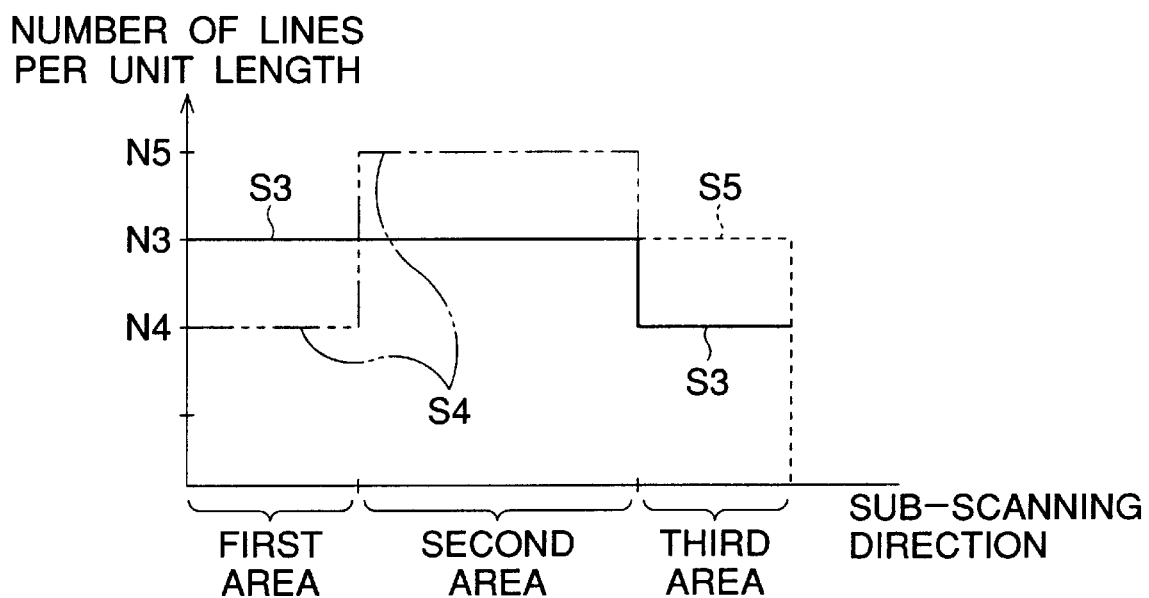
FIG. 10 is a graph showing a distribution of the number of read lines per unit length, which are read by the line sensor in the coarse scanning operation of the third embodiment.
Figure 11:
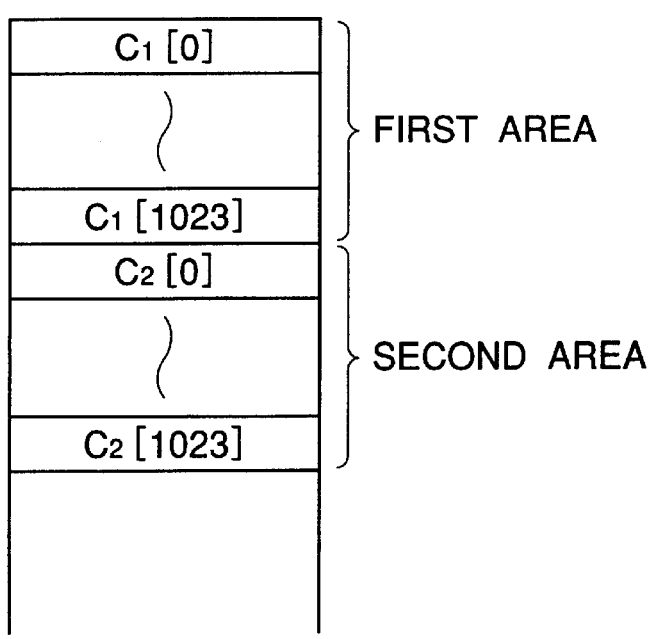
FIG. 11 shows a memory in which histograms, obtained in the coarse scanning operation of the third embodiment, are stored.

FIG. 9 shows a flowchart of a program for performing the coarse scanning operation in a third embodiment. This program corresponds to Steps 102 and 103 of the flowchart of the image reading routine shown in FIG. 4. FIG. 10 shows a distribution of the number of read lines per unit length, which are read by the line sensor 30 in the coarse scanning operation shown in FIG. 9. FIG. 11 shows a memory in which histograms, obtained in the coarse scanning operation shown in FIG. 9, are stored. The third embodiment will be described below with reference to these drawings. Note that the electrical and mechanical structures of the third embodiment is identical to those of the first embodiment.

As shown in FIG. 10, one image is divided into a first area, a second area and a third area, and these areas correspond to an order in which a scanning operation using the line sensor 30 is carried out. Namely, the image is scanned in order of the first, second and third areas.

In Step 201, the first area is coarse-scanned with a normal pitch. The coarse scanning operation with the normal pitch corresponds to a first reading mode, and the normal pitch is relatively fine. In Step 202, based on the image data of the first area obtained in Step 201, a histogram indicating a distribution of signal levels is generated, and the center of area (A1) of the histogram is calculated or obtained. Similarly, in Step 203, the second area is coarse-scanned with the normal pitch, and in Step 204, a histogram is generated based on the image data of the second area, and the center of area (A2) of the histogram is calculated or obtained.

The pitches of the coarse scanning operations in Steps 201 and 203 are the same as described above. Therefore, the number of read lines N3 per unit length is constant, as shown by a solid line S3 in FIG. 10. On the other hand, due to the execution of Steps 202 and 204, 10-bit data of the image signals corresponding to data C1[0] through C1[1023] of the histogram of the first area and data C2[0] through C2[1023] of the histogram of the second area are stored in the memory, shown in FIG. 11, of the computer 60.

In Step 205, it is determined whether the absolute value of the difference between the center of area (A2) of the histogram of the second area and the center of area (A1) of the histogram of the first area is greater than a predetermined value Q, i.e. whether there is a remarkable difference between a value (A2) of the image data obtained from the second area and a value (A1) of the image data obtained from the first area. In other words, it is determined whether there is a remarkable difference between the luminance of the image of the second area and the luminance of the image of the first area. When there is a remarkable difference between the luminance (i.e. the value (A2)) of the image of the second area and the luminance (i.e. the value (A1)) of the image of the first area, Steps 206 through 209 are executed.

In Step 206, each of the data C1[n] forming the histogram of the first area is multiplied by (2/3), and this result replaces the initial C1[n]. Consequently, in the drawing of the distribution of the number of read lines, shown in FIG. 10, the number of read lines of the first area becomes "N4" as shown by a double-chained line S4. In Step 207, each of the data C2[n] forming the histogram of the second area is multiplied by (4/3), and this result replaces the initial C2[n]. Consequently, in the drawing of the distribution of the number of read lines, shown in FIG. 10, the number of read lines of the second area becomes "N5" as shown by a double-chained line S4. In Step 208, the modified data C1m[n] of the histogram obtained in Step 206 and the modified data C2m[n] of the histogram obtained in Step 207 are summed, so that the combined data C1c[n] of the histogram obtained by scanning the first and second images in accordance with the distribution of the read lines shown by the double-chained line S4 is calculated.

In Step 209, the third area is coarse-scanned with 2/3 of the normal pitch, and thus the number of read lines per unit length of image signals from the part of the image contained in the third area are added to the combined data C1c[n] obtained in Step 208. Thus, total data Ct[n] of a histogram of the image data, which is obtained by a scanning operation, regarding the first and second areas, in accordance with the distribution of the number of lines indicated by the double-chained line S4, and regarding the third area, in accordance with the distribution of the number of lines indicated by the double-chained line S3, are calculated. Then, this coarse scanning operation ends. Namely, the number of lines per unit length in the third area is "N4" as shown by the solid line S3, and by executing Step 209, a histogram, indicating that the image data of the second area in a single image is weighted when performing a coarse scanning operation, is obtained.

Conversely, when it is determined that the difference between the value (A2) of the second area and the value (A1) of the first area is less than Q, Step 210 is executed, and this coarse scanning operation ends. In Step 210, the third area is coarse-scanned with the normal pitch, and in the drawing of the distribution of the number of lines shown in FIG. 10, the number of read lines of the third area becomes "N3" as shown by the broken line S5. Thus, when the luminance of the object in the image recorded in the second area is not relatively high, the image is coarse-scanned with a pitch, which is uniform over the whole of the image. Namely, an exposure measurement, in which no part of the image is weighted, is performed.

As described above, in the third embodiment, the first and second areas are coarse-scanned with a relatively fine pitch, and when it is determined that the luminance of the image of the second area is higher than that of the first area, the third area is coarse-scanned with a reading pitch, which is coarser than the relatively fine pitch. Then, first corrected data C1m[n], which is obtained by multiplying the data C1[n] of frequencies of the histogram obtained from the first area by a coefficient which is less than 1, second corrected data C2m[n], which is obtained by multiplying the data C2[n] of frequencies of the histogram obtained from the second area by a coefficient which is greater than 1, and data of frequencies of the histogram indicating the distribution of the signal level of the image data obtained from the third area, are added together, so that a histogram regarding the whole of the image is generated.

Therefore, in the coarse scanning operation in the third embodiment, the reading pitch need not be changed until the reading operation of the second area is completed. Thus, according to the third embodiment, in addition to the same effect which is obtained by the first embodiment, a control is simplified in comparison with the first embodiment, in so far as it is unnecessary to select the first or second reading mode prior to a start of the coarse scanning operation.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-160413 (filed on Jun. 3, 1997) which is expressly incorporated herein, by reference, in its entirety.

What is claimed is:

1. An image reading device comprising:
an optical sensor that reads an image recorded in a film, a single frame of said film having a first part and a second part; and
a scan control processor that intermittently moves at least one of said optical sensor and said film along a path with a predetermined reading pitch so that said optical sensor scans said image, said scan control processor being operable in a first reading mode in which said image recorded in said first part is read with a first reading pitch which is finer than a second reading pitch with which said image recorded in said second part is read, reading with said first reading pitch and said second reading pitch taking place while said one of said optical sensor and said film is moved in a single direction along said path;
wherein said first part corresponds to a center portion of said image, and said second part corresponds to a peripheral portion of said image.

2. A device according to claim 1, wherein said scan control processor is operable in a second reading mode in which said image is read with a third reading pitch which is uniform over said image.

3. A device according to claim 1, wherein said scan control processor is operable in said first reading mode when, prior to a regular scanning operation, a coarse scanning operation is performed, a reading pitch, with which said coarse scanning operation is performed, being coarser than that with which said regular scanning operation is performed.

4. A device according to claim 3, further comprising an exposure time determination processor that determines an exposure time of said optical sensor in said regular scanning operation, based on all of image data obtained by said optical sensor in said coarse scanning operation which is performed in said first reading mode, and a regular scanning operation performing processor that performs said regular scanning operation using said exposure time.

5. A device according to claim 1, wherein said image is divided into a first area, a second area and a third area, arranged in an order in which said optical sensor scans said image, an average value of image data obtained from said second area being different from an average value of image data obtained from said first area by a predetermined amount causing said scan control processor to operate such that said first and second areas correspond to said first part and said third area corresponds to said second part.

6. A device according to claim 5, further comprising a first histogram generating processor that generates first, second and third histograms showing a distribution of a level of image data obtained from said first area, said second area and said third area, respectively.

7. A device according to claim 6, further comprising a second histogram generating processor that sums first correction data obtained by multiplying data of every frequency of said first histogram by a coefficient which is less than 1, second correction data obtained by multiplying data of every frequency of said second histogram by a coefficient which is greater than 1, and data of every frequency of said third histogram, to generate a fourth histogram that corresponds to the whole of said image.

8. An image reading device comprising:
an optical sensor that reads an image recorded in a film, a single frame of said film having a first part and a second part; and
a scan control processor that intermittently moves at least one of said optical sensor and said film along a path with a predetermined reading pitch so that said optical sensor scan said image, said scan control processor being operable in a first reading mode in which said image recorded in said first part is read with a first reading pitch which is finer than a second reading pitch with which said image recorded in said second part is read, reading with said first reading pitch and said second reading pitch taking place while said one of said optical sensor and said film is moved in a single direction along said path;

wherein said image is divided into a first area, a second area and a third area, arranged in an order in which said optical sensor scans said image, an average value of image data obtained from said second area being different from an average value of image data obtained from said first area by a predetermined amount causing said scan control processor to operate such that said first and second areas correspond to said first part and said third area corresponds to said second part.

9. A device according to claim 8, further comprising a first histogram generating processor that generates first, second and third histograms showing a distribution of a level of image data obtained from said first area, said second area and said third area, respectively.

10. A device according to claim 9, further comprising a second histogram generating processor that sums first correction data obtained by multiplying data of every frequency of said first histogram by a coefficient which is less than 1, second correction data obtained by multiplying data of every frequency of said second histogram by a coefficient which is greater than 1, and data of every frequency of said third histogram, to generate a fourth histogram that corresponds to the whole of said image.

11. A device according to claim 8, wherein said scan control processor is operable in said first reading mode when, prior to a regular scanning operation, a coarse scanning operation is performed, a reading pitch, with which said coarse scanning operation is performed, being coarser than that with which said regular scanning operation is performed.

12. A device according to claim 8, wherein said scan control processor is operable in a second reading mode in which said image is read with a third reading pitch which is uniform over said image.

13. A device according to claim 12, further comprising an exposure time determination processor that determines an exposure time of said optical sensor in said regular scanning operation, based on all of image data obtained by said optical sensor in said coarse scanning operation which is performed in said first reading mode, and a regular scanning operation performing processor that performs said regular scanning operation using said exposure time.

14. An image reading device comprising:

an optical sensor that reads an image recorded in a film and outputs image data including pixel signals, a single frame of said film having a first part and a second part;

a scan control processor that moves at least one of said optical sensor and said film along a path so that said optical sensor scans said image; and a pixel control processor that controls a number of said pixel signals output from said optical sensor when said optical sensor scans said image, said pixel control processor being operable in a first reading mode in which said pixel signals of said first part are output with a first pixel pitch which is finer than a second pixel pitch with which said pixel signals of said second part are output, said first pixel pitch and said second pixel pitch being output while said one of said optical sensor and said film is moved in a single direction along said path;

wherein said first part corresponds to a center portion of said image, and said second part corresponds to a peripheral portion of said image.

15. A device according to claim 14, wherein said first part and said second part are aligned in a direction in which said optical sensor scans said image.

16. The image reading device according to claim 14, said scan control processor being operated in a first reading mode when, prior to a regular scanning operation, a cross-scanning operation is performed, a reading pitch, with which said cross-scanning operation is performed, being coarser than a pitch with which said regular scanning operation is performed.

17. The image reading device according to claim 14, wherein said scan control processor is operable in a second reading mode which said image is read with a third reading pitch which is uniform over said image.

18. The device according to claim 14, said image being divided into a first area, a second area and a third area arranged in a predetermined order in which said optical sensor scans said image, an average value of image data obtained from said second area being different from an average value of image data obtained from said first area by a predetermined amount causing said scan control processor to operate such that said first and second areas correspond to said first part and said third area corresponds to said second part.

19. The image reading device according to claim 18, further comprising a first histogram generating processor that generates first, second and third histograms showing a distribution of a level of image data obtained from said first area, said second area and said third area, a second histogram generating processor that sums first correction data obtained by multiplying data of every frequency of said first histogram by a coefficient that is less than 1, second correction data obtained by multiplying data of every frequency of said second histogram by a coefficient which is greater than 1, and data of every frequency of said third histogram to generate a fourth histogram that corresponds to the whole of said image.

* * * * *